United States Patent
Kawasumi (10) Patent No.: US 7,113,709 B2
(45) Date of Patent: Sep. 26, 2006

(54) REDUNDANT WDM TRANSMISSION SYSTEM OPTICAL RECEIVER WITH REDUCED VARIABLE OPTICAL ATTENUATORS AND/OR VARIABLE DISPERSION COMPENSATION MODULES

(75) Inventor: Tatsuya Kawasumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/024,854

(22) Filed: Dec. 30, 2004

(65) Prior Publication Data

US 2005/0123305 A1 Jun. 9, 2005

Related U.S. Application Data

(63) Continuation of application No. PCT/JP02/11901, filed on Nov. 14, 2002.

(51) Int. Cl.
H04B 10/06 (2006.01)
H04B 10/08 (2006.01)
H04B 17/00 (2006.01)
H04J 14/02 (2006.01)
H01S 3/00 (2006.01)

(52) U.S. Cl. ............... 398/208; 398/29; 398/81; 398/93; 398/209; 359/337.5

(58) Field of Classification Search ............... 398/82, 398/93, 29, 208–210, 81; 359/337.5, 339, 359/338
See application file for complete search history.

(56) References Cited

U.S. PATENT DOCUMENTS 6,903,324 B1 * 6/2005 Tomofuji et al. ..... 250/214 LA
2001/0019102 A1 9/2001 Chikuma
2002/0015207 A1 2/2002 Ooi et al.

OTHER PUBLICATIONS

English Language Abstract of Japanese Pub. No. 2000-236298 published Aug. 29, 2000.
English Language Abstract of Japanese Pub. No. 3-216030 published Sep. 24, 1991.
English Language Abstract of Japanese Pub. No. 7-111493 published Aug. 25, 1995.
English Language Abstract of Japanese Pub. No. 8-084116 published Mar. 26, 1996.
English Language Abstract of Japanese Pub. No. 3-026118 published Feb. 4, 1991.
English Language Abstract of Japanese Pub. No. 2000-013324 published Jan. 14, 2000.

(Continued)

Primary Examiner—Jason Chan
Assistant Examiner—Nathan Curs
(74) Attorney, Agent, or Firm—Staas & Halsey LLP (57) ABSTRACT

An optical receiver including a variable optical attenuator for controlling an optical loss value for each optical transmission line based on a predetermined optical loss value; a variable dispersion compensation module for controlling a wavelength dispersion value for each optical transmission line based on a predetermined dispersion value; an optical loss/dispersion controller for measuring the optical loss value and the wavelength dispersion value of every optical transmission line, outputting these values so that they are equal in all the optical transmission lines, and controlling the attenuator and the module based on the outputted predetermined values; a receive amplifier for receiving the optical signal whose light level is kept constant and amplifying the signal; and, a transmission line switch control module is provided for switching a working transmission line into a protection line if the optical signal level of the working line is lower than a threshold value.

9 Claims, 8 Drawing Sheets

OTHER PUBLICATIONS

English Language Abstract of Japanese Pub. No. 2000-237778 published Aug. 31, 2001.
English Language Abstract of Japanese Pub. No. 2002-057622 published Feb. 22, 2002.
English Language Abstract of Japanese Pub. No. 2001-119344 published Apr. 27, 2001.
English Language Abstract of Japanese Pub. No. 2000-115077 published Apr. 21, 2000.
English Language Abstract of Japanese Pub. No. 11-298410 published Oct. 29, 1999.
European Pub. No. 936760 published Aug. 18, 1999.
English Language Abstract of Japanese Pub. No. 2001-339371 published Dec. 7, 2001.
International Search Report in PCT/JP02/11901, mailed Feb. 12, 2003.

* cited by examiner

REDUNDANT WDM TRANSMISSION SYSTEM OPTICAL RECEIVER WITH REDUCED VARIABLE OPTICAL ATTENUATORS AND/OR VARIABLE DISPERSION COMPENSATION MODULES

This application is a continuing application, filed under 35 U.S.C. §111(a), of International Application PCT/JP2002/011901, filed Nov. 14, 2002.

BACKGROUND OF THE INVENTION (1) Field of the Invention

The present invention relates to an optical receiver, and more particularly to an optical receiver which is configured to receive an optical signal.

(2) Description of the Related Art

With recent variety of data flowing through a communication network and recent increase of users of the internet, the amount of data flowing through the network is growing more and more. To cope with the growth, it has been requested to expand the capacity and the scale of the network. In the field of long-distance communications, therefore, for the purpose of expanding the capacity of the network through the use of the existing optical fiber facility, the main focus is placed on the WDM (Wavelength Division Multiplex) transmission system.

This WDM transmission system is a system which is configured to multiplex lots of signals with their respective wavelengths into one fiber when those signals are transmitted. Hence, when the wavelength-division-multiplexed signal is transmitted, the amount of data flowing through the fiber is increased in proportion to the number of wavelengths to be multiplexed. Since the WDM transmission treats a large amount of data to be transmitted through one fiber, if some accident such as a disaster or a malicious deed is brought about in the fiber facility, the communication network is far more greatly impaired. For protecting the WDM transmission line, therefore, the WDM transmission line ordinarily includes a redundant configuration, that is, a working system line and a protection system line.

Traditionally, a system for automatically controlling dispersion compensation required in switching a line has been proposed on the assumption that the WDM transmission line has the redundant configuration. For example, refer to the Official Gazette of Japanese Unexamined Patent Publication 2000-236298 (paragraph numbers [0014] to [0017], FIG. 1).

However, in building the redundant configuration of the conventional WDM system, the redundant provision of switches for switching a transmission line in the transmitting station and the receiving station of the WDM transmission system, that is, the redundantly switching of a transmission line for each signal wavelength makes the system too large in scale because the system needs the same number of switches and transponders as the number of signal wavelengths to be treated. The massive system has a shortcoming that it is not reasonable in a variety of factors such as initial cost, running cost, maintenance, and reliability.

As another shortcoming, for realizing the redundant configuration as keeping the system less large in scale, it has been considered to provide a transmission switching function after the signal is wavelength-division-multiplexed and a receive switching function before the signal is wavelength-division-multiplexed. This provision of the switching functions also has a shortcoming that the receive amplifier needs a considerable length of time until the amplifier enters into a stable state after switched and thereby the main signal stays in an erroneous state for a relatively long time, because the amplifier greatly varies its dynamic range and makes its transient response too large.

On the other hand, the foregoing Japanese Unexamined Patent Publication No. 2000-236298 is dedicated for controlling the dispersion compensation in switching a signal wavelength. No consideration is given to the delay of the transient response of the receive amplifier occurring when the transmission line is switched and the number of components of the overall redundant configuration is reduced.

SUMMARY OF THE INVENTION

The present invention is made to overcome the foregoing shortcomings. It is therefore an object of the present invention to provide an optical receiver which is configured to keep the redundancy of the WDM transmission line entailed in the overall optical receiver suppressed and improve the quality of transmission even in switching the transmission line.

In carrying out the object, the present invention provides an optical receiver for receiving an optical signal. According to an aspect of the invention, the optical receiver includes variable optical attenuators located respectively on a plurality of optical transmission lines configured redundantly and for controlling optical loss values of those optical transmission lines based on a predetermined optical loss value, variable dispersion compensation modules located respectively on those optical transmission lines and for controlling wavelength dispersion values of those optical transmission lines based on a predetermined dispersion value, an optical loss/dispersion controller for measuring the optical loss value and the wavelength dispersion value of the optical transmission lines and outputting the predetermined optical loss value and the predetermined dispersion value so as to keep the optical loss values and the wavelength dispersion values equal in all the optical transmission lines, for controlling the variable optical attenuators and the variable dispersion compensation modules based on the outputted predetermined optical loss value and wavelength dispersion value, a receive amplifier for receiving the optical signal whose light level is kept constant as a result of the control of the optical loss values of all the optical transmission lines and amplifying the received optical signal, and a transmission line switch controller for monitoring the optical signal level of the working optical transmission line and switching the working optical transmission line into a protection optical transmission line if the optical signal level is lower than a threshold value.

The above and other objects, features and advantages of the present invention will become apparent from the following description when taken in conjunction with the accompanying drawings which illustrated preferred embodiments of the present invention by way of example.

DESCRIPTION OF THE PREFERRED EMBODIMENTS

Figure 1:
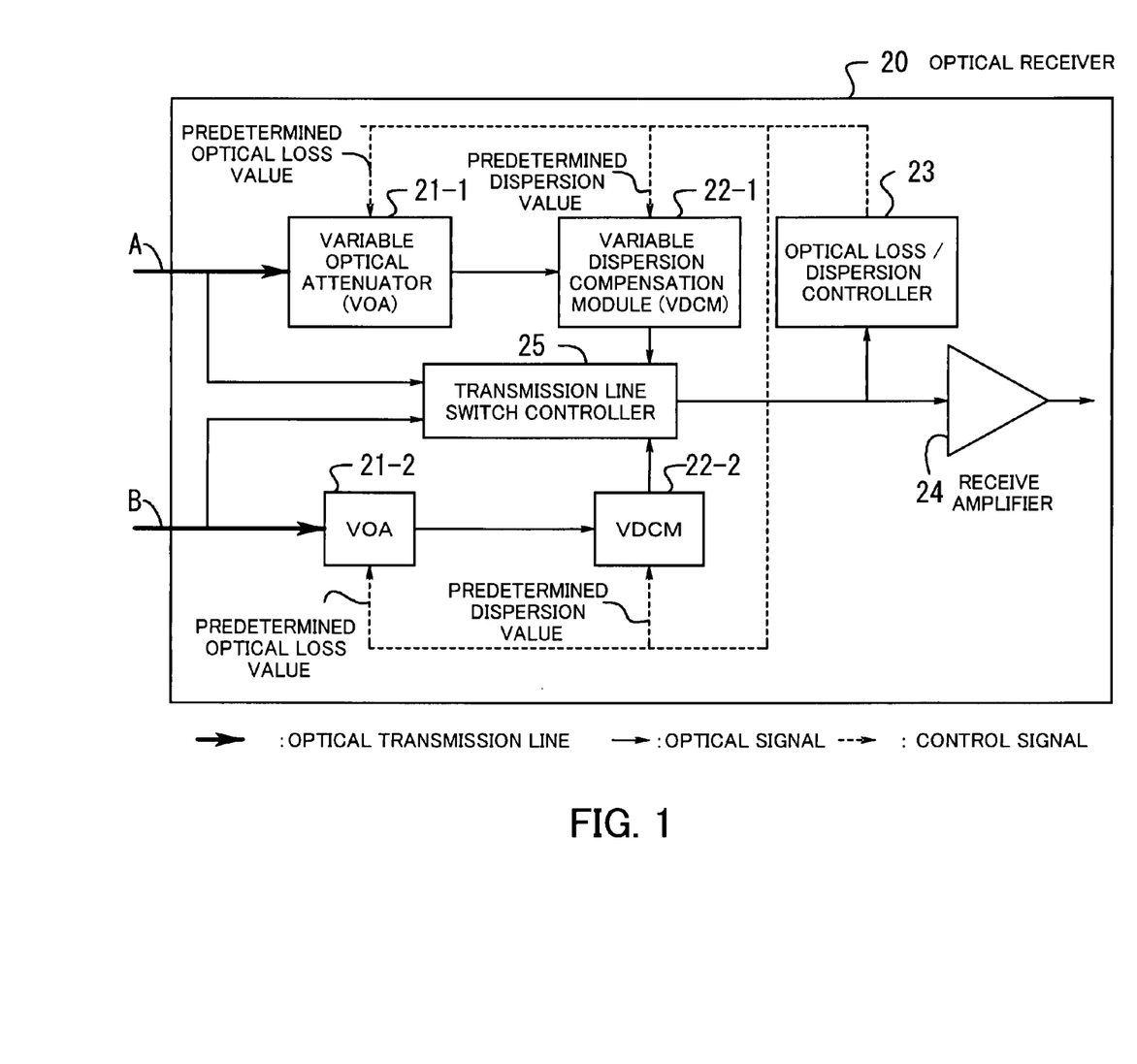
FIG. 1 is a conceptual diagram showing a optical transmission system according to the present invention.

Hereafter, the embodiments of the present invention will be described with reference to the appended drawings. FIG. 1 illustrates the concept of the optical receiver according to the present invention. An optical receiver 20 is installed on the side of a receiving station of the system with the redundant configuration of optical transmission lines (the redundant provision of two optical transmission lines A and B in FIG. 1).

Variable optical attenuators 21-1 and 21-2 (often referred simply to as VOAs) are installed respectively on the optical transmission lines A and B prepared for the redundant configuration. These VOAs control an optical loss value of each line based on a predetermined optical loss value. Variable dispersion compensation modules 22-1 and 22-2 (often referred simply to as a VDCM) are installed respectively on two optical transmission lines A and B prepared for the redundant configuration. The VDCM controls the wavelength dispersion value for the corresponding optical transmission line based on the predetermined dispersion value. The wavelength dispersion means a phenomenon that the waveform transmitting through the fiber is spreading on a time axis. An optical loss/dispersion controller 23 measures optical loss values and wavelength dispersion values of these two optical transmission lines A and B in advance and outputs the predetermined optical loss value and the predetermined dispersion value so as to keep the optical loss values and the wavelength dispersion values equal in these optical transmission lines. Through the predetermined optical loss value and predetermined dispersion value, the VOAs 21-1 and 21-2 and the VDCMs 22-1 and 22-2 are controlled by the optical loss/dispersion controller 23. A receive amplifier 24 receives the optical signal kept at a constant light level and amplifies the optical signal. That is, since the optical loss values of the optical transmission lines A and B are adjustably controlled so that these values may be kept at constant level by the VOAs 21-1 and 21-2, the receive amplifier 24 is inputted with the optical signal kept at constant level. A transmission line switch controller 25 monitors the optical signal level of the working optical transmission line and then switches the line into the protection optical transmission line if the monitored optical signal level is lower than a threshold value. For example, while the optical signal is being received from the optical transmission line A as default, if the level of this optical signal is equal to or less than the threshold value, the transmission line switch controller 25 switches the optical transmission line A into the line B.

Figure 2:
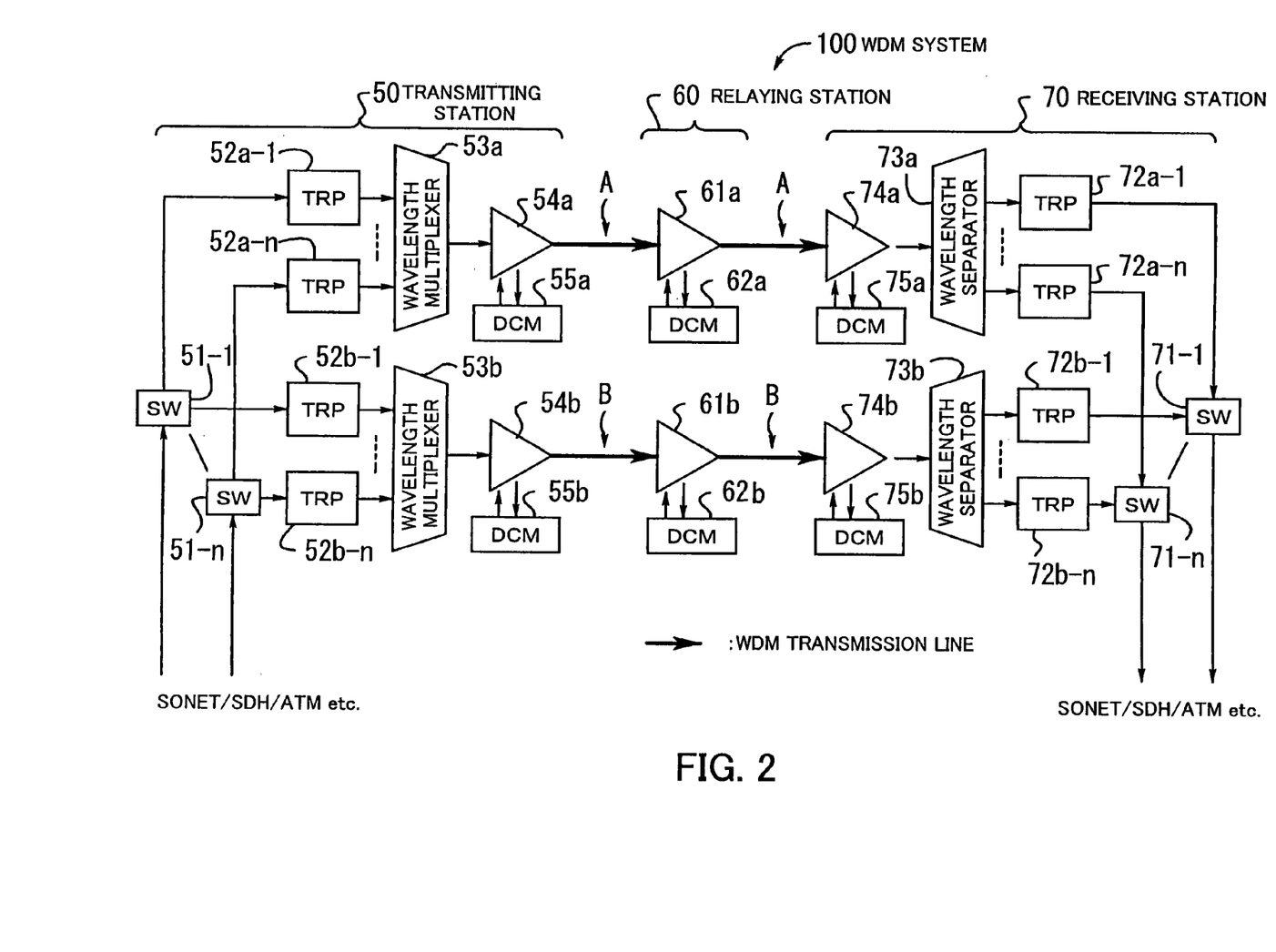
FIG. 2 is a diagram showing a redundant system of WDM transmission lines.

In turn, the shortcomings to be overcome by the present invention will be discussed in detail below. FIG. 2 shows a redundant system of the WDM transmission. The WDM system 100 is the conventional redundantly configured system, which provides a switch for switching the transmission line between a transmitting station 50 and a receiving station 70 so that the switch may change over the line alternately for each wavelength.

The transmitting station 50 includes switches 51-1 to 51-n. On the side of the WDM transmission line A, the transmitting station 50 includes transponders 52a-1 to 52a-n, a wavelength multiplexer 53a, a transmit amplifier 54a and a dispersion compensation module (often referred simply to as a DCM) 55a. On the side of the WDM transmission line B, the transmitting station 50 includes transponders 52b-1 to 52b-n, a wavelength multiplexer 53b, a transmit amplifier 54b, and a DCM 55b. A relaying station 60 includes a relay amplifier 61a and a DCM 62a on the side of the WDM transmission line A and a relay amplifier 61b and a DCM 62b on the side of the WDM transmission line B. The receiving station 70 includes switches 71-1 to 71-n. On the side of the WDM transmission line A, the receiving station 70 includes a receive amplifier 74a, a DCM 75a, a wavelength separator 73a, and transponders 72a-1 to 72a-n. On the side of the WDM transmission line B, the receiving station 70 includes a receive amplifier 74b, a DCM 75b, a wavelength separator 73b, and transponders 72b-1 to 72b-n.

The operation of the WDM system will be described below. The switches 51-1 to 51-n select one of the WDM transmission lines A and B, switch the received optical signal such as SONET, SDH, or ATM, and then output the optical signal to the transponders 52a-1 to 52a-n or the transponders 52b-1 to 52b-n.

In the operation executed on the side of the WDM transmission line A, the transponders 52a-1 to 52a-n receive the signals from the switches 51-1 to 51-n and band-convert the signals for the wavelength division multiplex (WDM). The wavelength multiplexer 53a performs the wavelength multiplex with respect to the band-converted signal for generating the WDM signal. The transmit amplifier 54a amplifies the WDM signal and outputs the amplified signal onto the WDM transmission line A.

The relaying amplifier 61a relays and amplifies the received WDM signal. The receive amplifier 74a also amplifies the received WOM signal. The DCMs 55a, 62a and 75a compensate for the wavelength dispersion so as to eliminate the accumulated dispersions on the WDM transmission line A, respectively. The wavelength separator 73a separates the WDM signal with respect to each wavelength. The transponders 72a-1 to 72a-n performs the converse band conversion to the transponders on the transmitting side for generating the optical signal such as SONET, SDH or ATM. This holds true to the operation on the side of the WDM transmission line B. The switches 71-1 to 71-n select one of the WDM transmission lines A and B so as to alternately change the optical signal from the transponders 72a-1 to 72a-n into the optical signal from the transponders 72b-1 to 72b-n.

As described above, the WDM system 100 is configured to control the switch of the transmission lines with respect to each wavelength. It means that about the switches 51-1 to 51-n, the transponders 52a-1 to 52a-n, 52b-1 to 52b-n, the switches 71-1 to 71-n, the transponders 72a-1 to 72a-n, and 72b-1 to 72b-n, the figure "n" is required to be the same as the number of wavelengths and the DCMs are also required to be located so that the compensation may be made optimal to each transmission line. This disadvantageously makes the system complicated and large in scale. For example, today, there exists a system for supporting the almost same number of wavelengths as 200. This sort of system needs as many a transponder unit as 200 wavelengths×2 (for transmission and receiving)×2 (for redundancy)=800. It is understood from this number that the system is made too large in scale.

Figure 3:
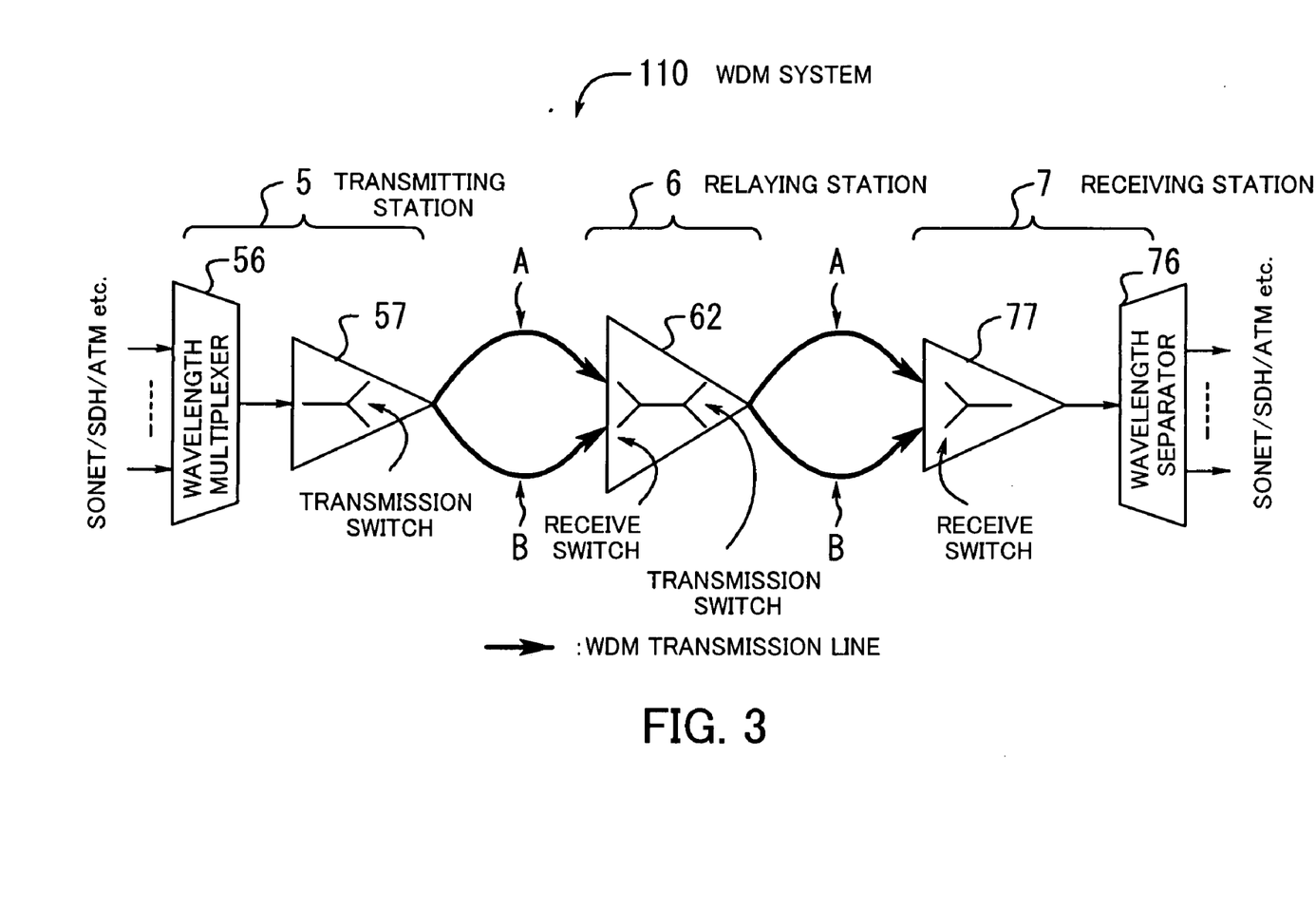
FIG. 3 is a diagram showing a redundant system of WDM transmission lines.

FIG. 3 shows the schematic redundant system for the WDM transmission. The WDM system 110 is the conventional system which is configured to have a transmission line switching function after the signal is subject to the wavelength division multiplex and a receive switching function before the signal is subject to the wavelength division de-multiplex.

Concretely, the transmitting station 5 includes the wavelength multiplexer 56 and a transmit amplifier 57. The relaying station 6 includes a relay amplifier 62. The receiving station 7 includes a receive amplifier 77 and a wavelength separator 76. The transmit amplifier 57 includes a transmit switching function. The relay amplifier 62 includes a transmit/receive switching function, while the receive amplifier 77 includes a receive switching function. The wavelength multiplexer 56 generates a WDM signal through the effect of the wavelength multiplexing process of the optical signals such as SONET, SDH and ATM. The transmit amplifier 57 amplifies the WDM signal, selects any one of the WDM transmission lines A and B, and then outputs the amplified signal onto the selected line. In the case that the WDM transmission line A is selected, on the receiving side, the relay amplifier 62 selects the WDM transmission line A, receives the WDM signal from the selected line A, and then amplifies the WDM signal, while on the transmit side, the receive amplifier 77 selects the WDM transmission line A, receives the WDM signal from the selected line A, and then amplifies the WDM signal. The wavelength separator 76 separates the WDM signal with respect to each wavelength.

Unlike the aforementioned system shown in FIG. 2, the WDM system 110 includes only the WDM transmission line configured as the redundant part. As an advantage, this results in reducing the system in scale. On the other hand, as a disadvantage, when the transmission line is switched, the relay amplifier 62 and the receive amplifier 77 may lower their dynamic ranges than those before switching the line or make their transient responses slower. This disadvantage results in taking a considerable length of time until the relay amplifier 62 and the receive amplifier 77 enter into the stable operating state, thereby making the amount of errors occurring in the main signal larger and the error time longer. Herein, the working transmission line may have a different optical loss value than the protection transmission line (because both of the transmission lines do not use the fiber with the same characteristic and distance). This may bring about the change of the dynamic range and the transient response caused when the line is switched.

Further, the relay amplifier 62 and the receive amplifier 77 located on the receiving side are specified so that those amplifiers may output a constant value. Hence, if both of the transmission lines have different optical loss values from each other, the optical signal inputted to one transmission line has the different light level from that inputted to the other line. It means that the amplifiers located on the receiving side are required to control a pumping laser ordinarily built in each of these amplifiers in an analog manner so that amplification factors may be optimal (reducing noises to a minimum) to keeping the levels of the outputted optical signals constant. This control is a factor to taking a considerable length of time in keeping the amplifying operation stable.

Under the foregoing circumstances, the present invention is made to build the redundantly configured system of the WDM transmission lines which is smaller in scale than the foregoing conventional system and to overcome the shortcomings such as change of the transient response caused by the difference of the optical loss value between the optical transmission lines, for enhancing the quality of the WDM transmission.

Figure 4:
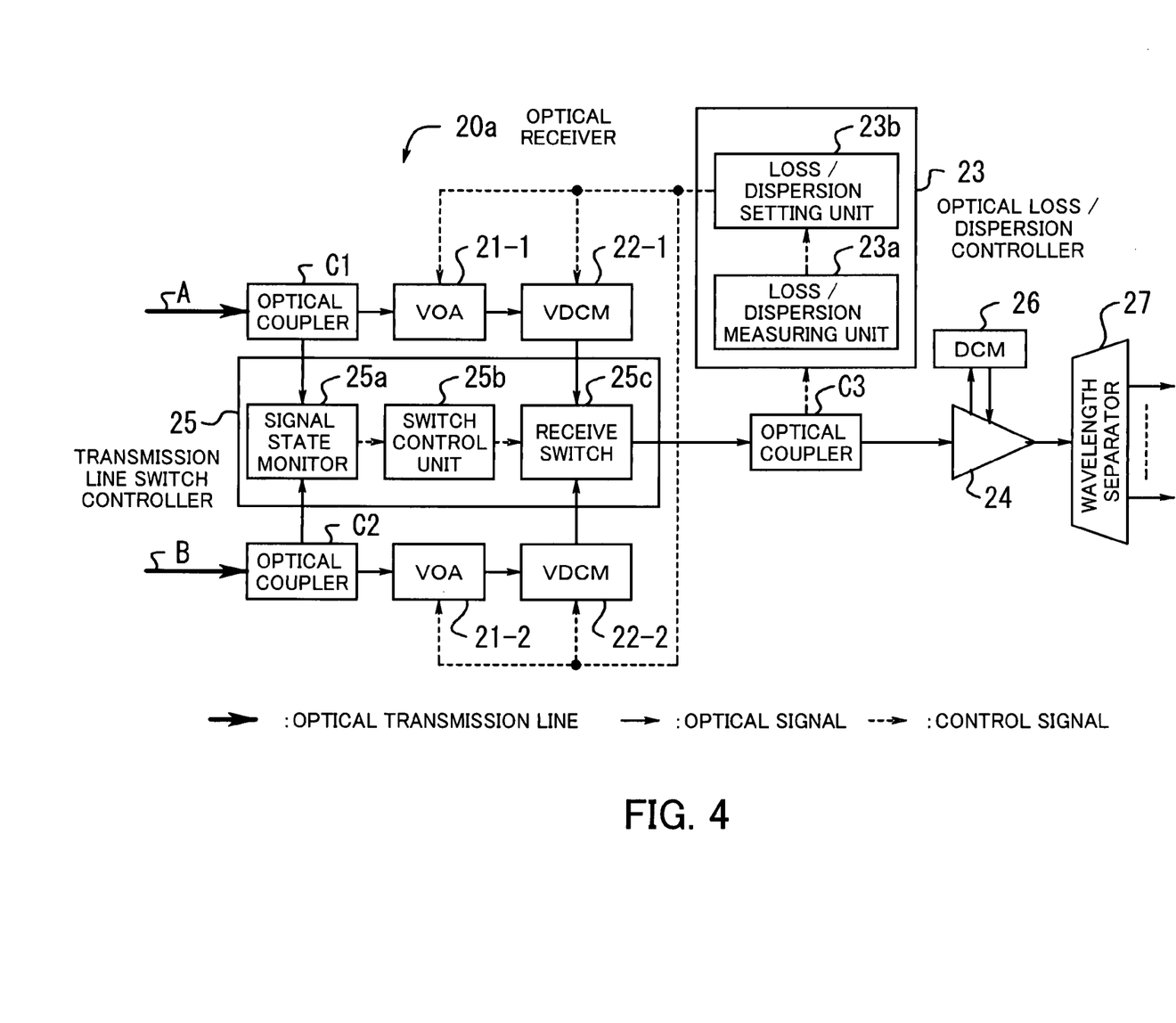
FIG. 4 is a block diagram showing a configuration of an optical receiver.

In turn, the description will be oriented to the configuration and the operation of the optical receiver 20. Hereafter, the description will be expanded on the case that the present invention is applied to the wavelength division multiplex (WDM) system transmission. FIG. 4 shows the configuration of the optical receiver.

The optical receiver 20a includes an optical coupler C1, a variable optical attenuator (VOA) 21-1, and a variable dispersion compensation module (VDCM) 22-1 on the side of the WDM transmission line A, and the optical coupler C2, the VOA 21-2, and the VDCM 22-2 on the side of the WDM transmission line B. Further, an optical coupler C3, a receive amplifier 24, a dispersion compensation module (DCM) 26, and a wavelength separator 27 are installed on the optical transmission line connecting to the switched line A or B. Further, a transmission line switch controller 25 and an optical loss/dispersion controller 23 are included in the optical receiver 20a. This switch controller 25 is arranged to have a signal state monitor 25a, a switch control unit 25b, and a receive switch 25c. The optical loss/dispersion controller 23 is arranged to have a loss/dispersion measuring unit 23a and a loss/dispersion setting unit 23b.

The operation of the optical receiver 20a will be described below. The optical coupler C1 branches the optical signal passing through the WDM transmission line A into the VOA 21-1 and the signal state monitor 25a. The optical coupler C2 branches the optical signal passing through the WDM transmission line B into the VOA 21-2 and the signal state monitor 25a. The signal state monitor 25a monitors the levels of the optical signals passing through the WDM transmission lines A and B, compares each signal level with a predetermined threshold value, and, if the signal level is lower than the threshold value, notifies the switch control unit 25b of the fact. In response to the notice, the switch control unit 25b outputs a message for switching the transmission line to the receive switch 25c. Then, the receive switch 25c selects the optical signal sent from one of the WDM transmission line A (outputted from the VDCM 22-1) and the WDM transmission line B (outputted from the VDCM 22-2) and then outputs the selected optical signal to the optical coupler C3. The optical coupler C3 branches the received optical signal into the loss/dispersion measuring unit 23a and the receive amplifier 24.

In turn, the loss/dispersion measuring unit 23a and the loss/dispersion setting unit 23b will be described in detail. The loss/dispersion measuring unit 23a measures the optical loss values (simply referred to as the loss value) and the wavelength dispersion values (simply referred to as the dispersion value) of the WDM transmission lines A and B in advance. The loss/dispersion setting unit 23b calculates the difference of the measured loss value between the WDM transmission lines A and B and then controls the predetermined values of the VOA 21-1 and 21-2 so that the loss values on both of the transmission lines are equal to each other. Further, the loss/dispersion setting unit 23b also calculates the difference of the dispersion value between the WDM transmission lines A and B and controls the predetermined values of the VDCM 22-1 and 22-2 so that the dispersion values on the transmission lines A and B are equal to each other.

These VDCMs 22-1 and 22-2 are intended not for the dispersion compensation itself but for compensating for a shift of the dispersion value between the WDM transmission lines A and B. Hence, these VDCM 22-1 and 22-2 may be reduced in size. (However, it should be noted that the allowable difference between the transmission lines to be covered by the system of the present invention depends upon the largeness of the dispersion value width to be absorbed by the VDCM.)

Further, the VOAs 21-1 and 21-2 and the VDCMs 22-1 and 22-2 to be controlled by the loss/dispersion setting unit 23b are arranged so that their predetermined values may be varied only at the initial setting time. No change of the predetermined values is brought about when the transmission line is switched. When changing the predetermined values of the VOAs 21-1, 21-2 and the VDCMs 22-1, 22-2, an initialization signal is supplied to the loss/dispersion measuring unit 23a so that the unit 23a may measure the loss values and the dispersion values on both of the transmission lines again and the loss/dispersion setting unit 23b may change the predetermined values of the VOAs 21-1, 21-2 and the VDCMs 22-1, 22-2 again.

As described above, the optical receiver 20a of the present invention is configured to absorb the difference of the loss value or the dispersion value between the redundantly configured WDM transmission lines A and B when receiving the optical signal. Further, the optical receiver 20a adjusts the difference of the loss value on each transmission line through the effect of the VOAs 21-1 and 21-2 so that the receive amplifier 24 may be inputted with the signal having the same light level even if it is sent from any one of these transmission lines. Hence, the receive amplifier 24 may constantly receive the stable optical signal. It means that unlike the conventional configuration, the optical receiver 20a does not require the amplification factor control for keeping the light level of the outputted signal constant.

Figure 5:
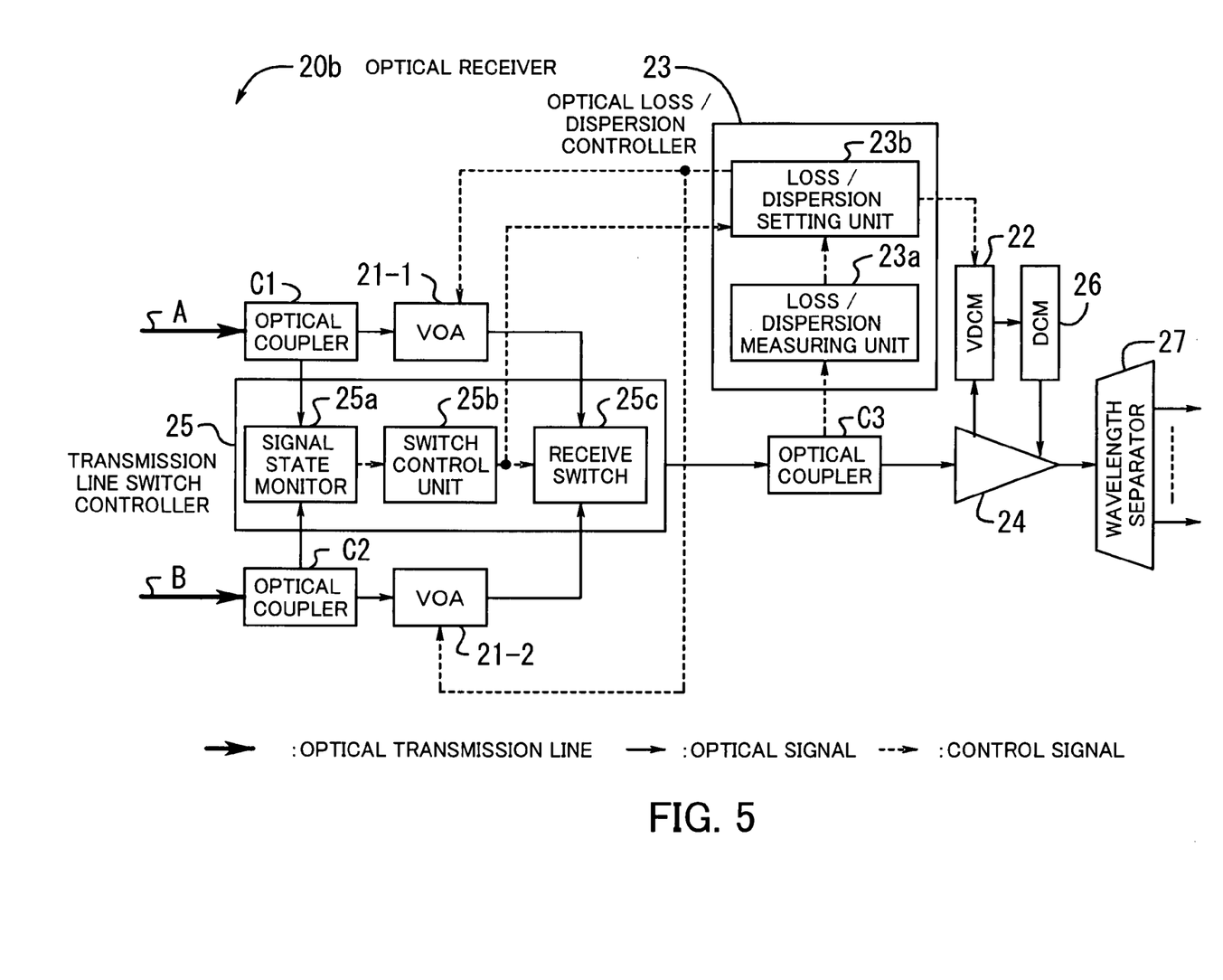
FIG. 5 is a block diagram showing another configuration of an optical receiver.

In turn, the description will be oriented to some transformations of the present invention. The first transformation is intended for receiving an optical signal from the redundantly configured transmission lines but is configured to reduce the number of the VDCMs in comparison with that of the optical receiver 20a shown in FIG. 4. FIG. 5 shows the configuration of the optical receiver 20b according to the first transformation. The optical receiver 20b is configured to install one VDCM 22 in series to the DCM 26 inserted between the VDCM 22 itself and the receive amplifier 24 in place of the pair of VDCMs 22-1 and 22-2 of the optical receiver 20a shown in FIG. 4. Further, the loss/dispersion setting unit 23b receives a message for switching the transmission line from the switch controller 25b. The other configuration is the same as that shown in FIG. 4.

In the operation of the optical receiver 20b, about the loss values and the dispersion values of the WDM transmission lines A and B, the values measured by the loss/dispersion measuring unit 23a in advance at the initial rise are held in the loss/dispersion setting unit 23b. Hence, the loss/dispersion setting unit 23b calculates the differences of the loss value between the WDM transmission lines A and B and controls the VOAs 21-1 and 21-2 so as to keep the loss values on both of the transmission lines equal to each other. Turning to the dispersion value, in response to the message for switching the transmission line, the loss/dispersion setting unit 23b outputs to the VDCM 22 the predetermined dispersion value matched to the dispersion value of the WDM transmission line to be switched from now on.

The foregoing control makes it possible to reduce the number of components of the optical receiver 20b in comparison with the optical receiver 20a shown in FIG. 4. Moreover, since the loss value held in the VDCM 22 is not changed, the dynamic setting of the VDCM 22 does not have any influence on the operation of the receive amplifier 24.

Figure 6:
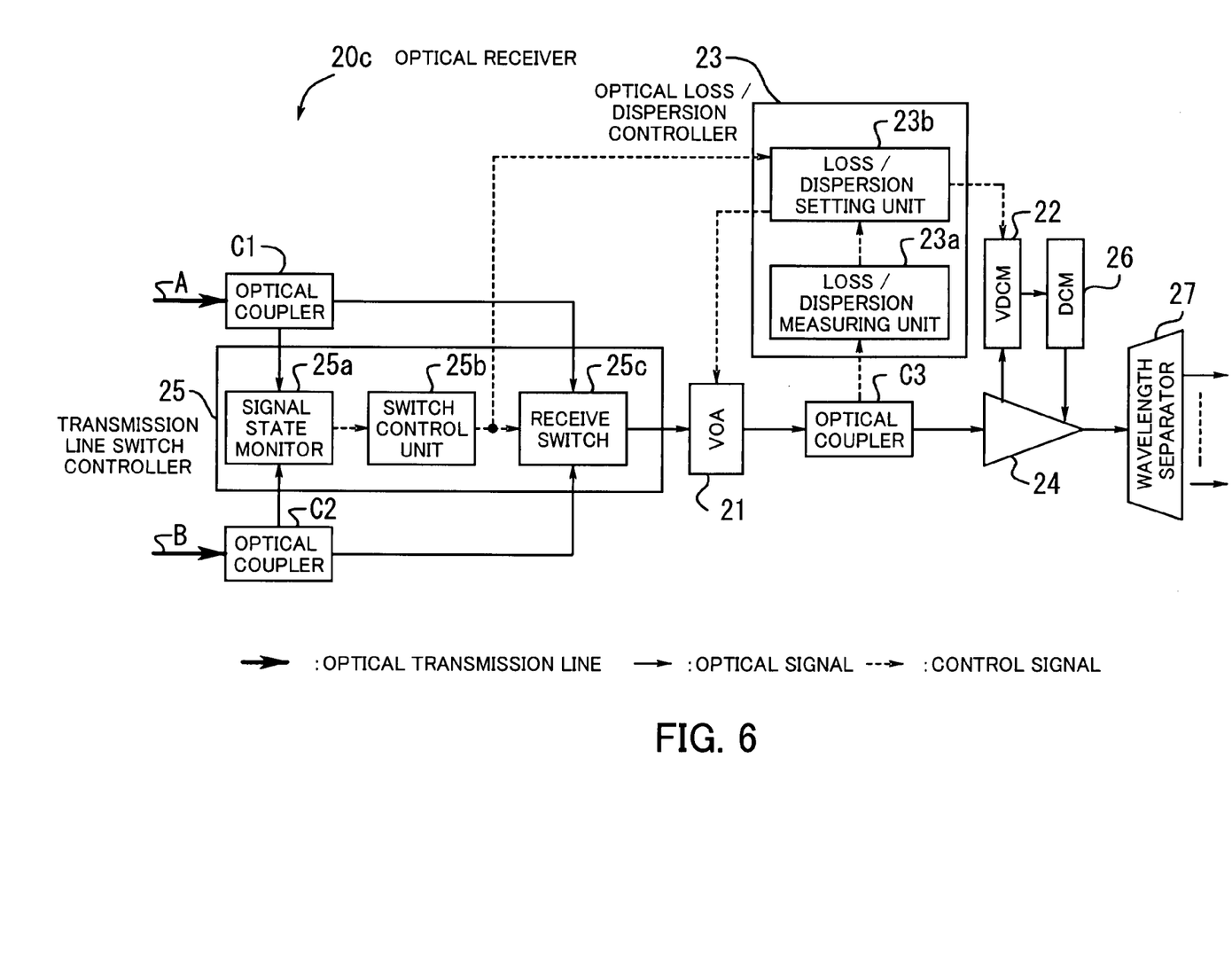
FIG. 6 is a block diagram showing another configuration of an optical receiver.

In turn, the description will be oriented to the second transformation of the present invention. The second transformation of the optical receiver is intended for receiving an optical signal from the redundantly configured transmission lines but is configured to reduce the number of VOAs more than that of the optical receiver 20b shown in FIG. 5. FIG. 6 shows the configuration of the optical receiver 20c according to the second transformation. In place of the pair of VOAs 21-1 and 21-2 included in the optical receiver 20b shown in FIG. 5, the optical receiver 20c includes one VOA 21 installed at a previous stage of the receive amplifier 24. The other configuration is the same as that shown in FIG. 5.

In the operation of the optical receiver 20c, about the loss values and the dispersion values of the WDM transmission lines A and B, like the optical receiver 20b, the values measured by the loss/dispersion measuring unit 23a before the initial rise are held in the loss/dispersion setting unit 23b. Then, in response to the message for switching the transmission line when the switch of the transmission line takes place, the loss/dispersion setting unit 23b outputs to the VOA 21 and the VDCM 22 the predetermined optical loss value and the predetermined dispersion value corresponding with the loss value and the dispersion value of the WDM transmission line to be switched from now on. This control makes it possible to reduce the number of components of the optical receiver 20c more than that of the optical receiver 20b shown in FIG. 5.

Figure 7:
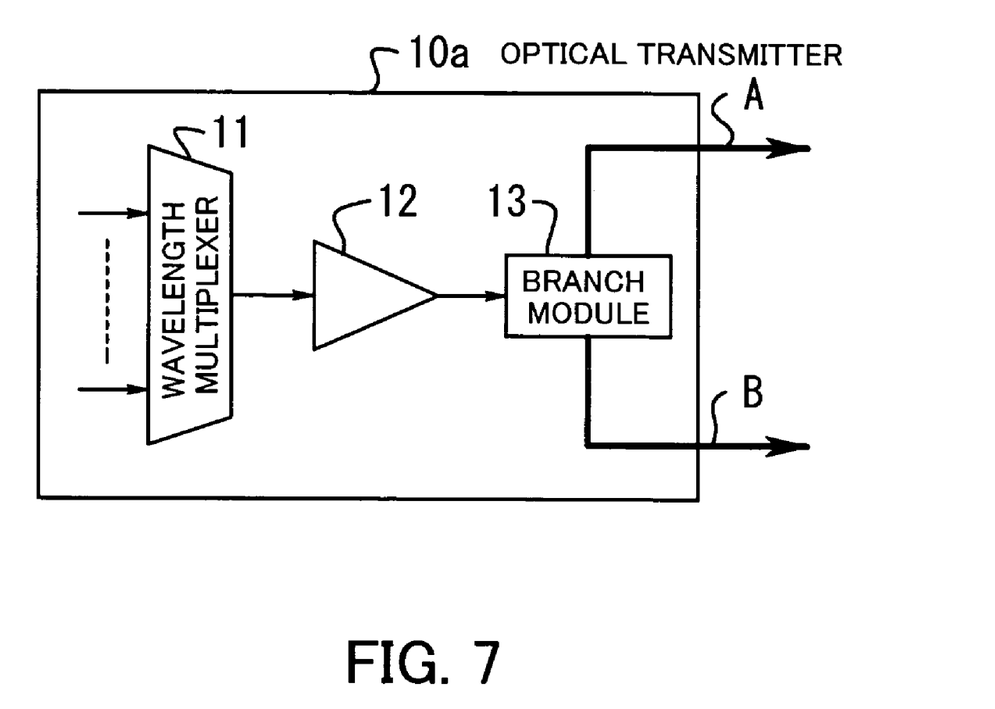
FIG. 7 is a block diagram showing another configuration of an optical transmitter.

In turn, the description will be oriented to an optical transmitter for the optical receiver according to the present invention. FIG. 7 shows the configuration of the optical transmitter 10a. The optical transmitter 10a does not have a function of switching the WDM transmission line A to the line B or vice versa. The optical transmitter 10 includes a wavelength multiplexer 11, a transmit amplifier 12, and a branch module 13. The wavelength multiplexer 11 multiplexes a plurality of optical signals. The transmit amplifier 12 amplifies the multiplexed optical signal. The branch module 13 outputs the amplified optical signal onto the WDM transmission lines A and B.

The foregoing configuration allows the same optical signal to pass through the WDM transmission lines A and B. Whichever of the WDM transmission lines A and B may be selected by the optical receiver of the present invention, no influence is given to the optical transmitter 10a. However, since the optical transmitter 10a branches the output of the transmit amplifier 12 into two, the resulting transmission distance is made shorter than the transmission distance allowed when the output is transmitted on only one WDM transmission line.

Figure 8:
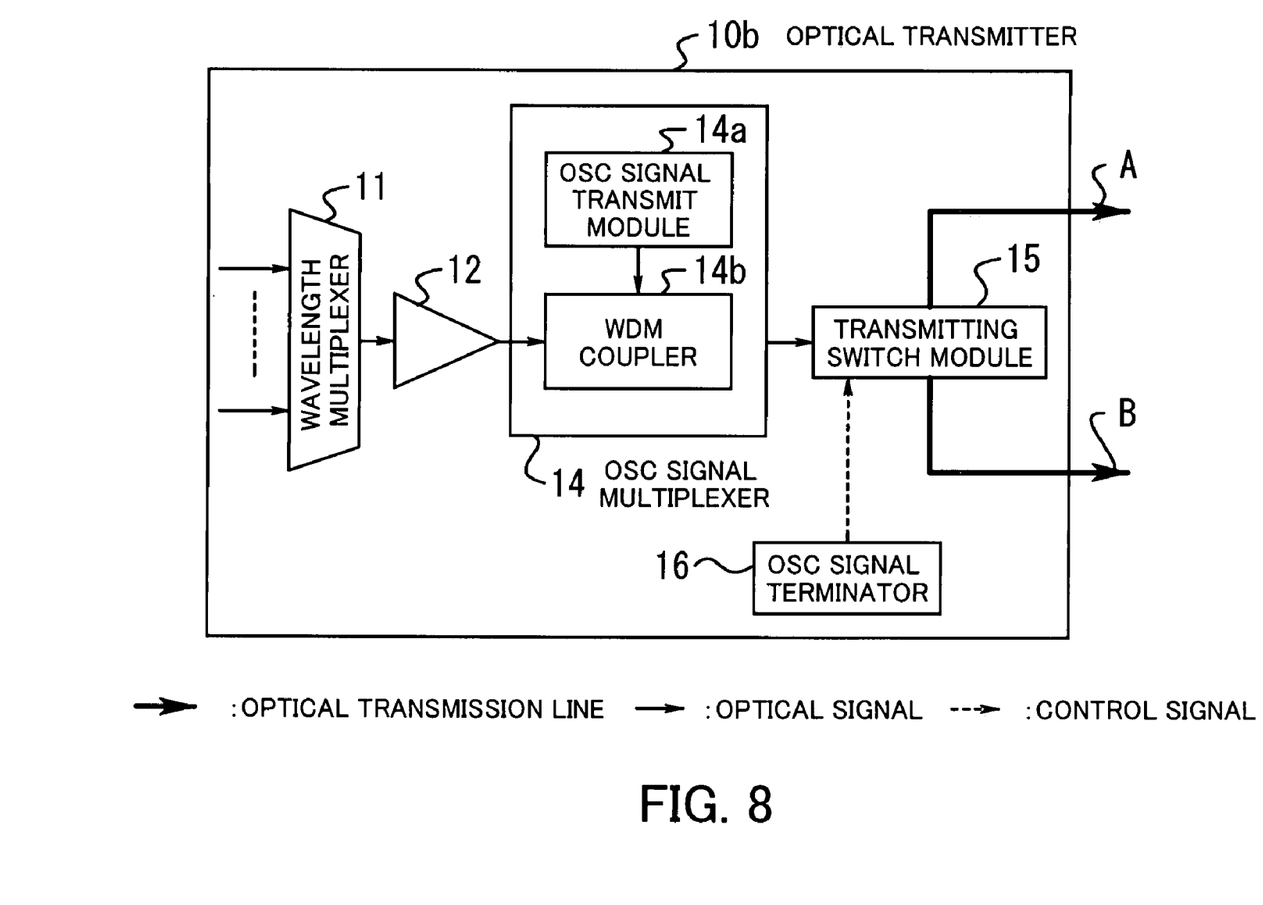
FIG. 8 is a block diagram showing a configuration of an optical transmitter.

FIG. 8 shows a configuration of the optical transmitter 10b. The optical transmitter 10b has a function of switching the WDM transmission line A to the line B or vice versa. The optical transmitter 10b includes a wavelength multiplexer 11, a transmit amplifier 12, an OSC (Optical Supervisory Channel) signal multiplexer 14, a transmitting switch module 15, and an OSC signal terminator 16. The OSC signal multiplexer 14 is composed of the OSC signal transmit module 14a and the WDM coupler 14b. In addition, the WDM system provides an optical monitor signal called an OSC in the range of 1.5 to 150 Mb/s, by which OSC signal the promotion is specified and the device is monitored.

The OSC signal transmit module 14a recognizes the WDM transmission line through which the receive module included in the optical transmitter 10b for receiving the optical signal sent from the opposite side (that is, the optical receiver according to the present invention) and then transmits the relevant information as the OSC signal to the WDM coupler 14b. The WDM coupler 14b multiplexes the main signal from the transmit amplifier 12 onto the OSC signal and then transmits the multiplexed signal to the transmit switch module 15.

The OSC signal terminator 16 receives the OSC signal sent from the opposite side, (in which case the optical receiver includes an OSC signal notice module for notifying the optical transmitter 10b of the selected transmission line through the OSC signal). Then, the OSC signal terminator 16 determines the WDM transmission line through which the receive module on the opposite side receives the optical signal and then notifies the transmitting switch module 15 of the determined line.

The transmitting switch module 15 controls the switching of the WDM transmission lines so that the WDM transmission line currently selected by the module 15 itself may constantly coincide with the WDM transmission line selected on the receive side. Then, the transmitting switch module 15 sends out the optical signal outputted from the WDM coupler 14b through the selected WDM transmission line. This sort of optical transmitter 10b sends out the WDM signal onto any one of the WDM transmission lines A and B configured redundantly, which allows the signal to be transmitted over a long distance.

The combination of the foregoing optical transmitter with any one of the optical receivers 20a to 20c shown in FIGS. 4 to 6 as the opposite receiving side results in building the optical transmission system according to the present invention. In this case, as the device on the transmitting side, the optical transmitter 10b shown in FIG. 8 is the most appropriate. In place, however, the foregoing transmitting station 50 shown in FIG. 2 or the optical transmitter 10a shown in FIG. 7 may be used. In any case, the number of components may be remarkably reduced in comparison with the number of components of the conventional redundantly configured WDM transmission system.

Further, the present invention is effective in suppressing the delayed transient response of the amplifiers on the receiving side that has been conventionally disadvantageous. This thus allows the amplifiers to constantly operate at a normal mode even when the transmission line is switched, thereby being able to improve the transmission quality.

As described above, the optical receiver according to the present invention is configured to measure the optical loss values and the wavelength dispersion values of the optical transmission lines configured redundantly, control the variable optical attenuator and the variable dispersion compensation module so that the optical loss values and the wavelength dispersion values are equal in all the optical transmission lines, and cause the receive amplifier to receive the optical signal whose light level is kept constant and then to amplify the received optical signal. This configuration results in being able to reduce the overall system for the redundant configuration of the optical transmission line in scale and improve the transmission quality when the transmission line is switched.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical receiver for receiving an optical signal, comprising:
    variable optical attenuators located respectively on a plurality of optical transmission lines configured redundantly and for controlling optical loss values for the optical transmission lines based on a predetermined optical loss value;
    variable dispersion compensation modules located respectively on the plurality of optical transmission lines configured redundantly and for controlling wavelength dispersion values for the optical transmission lines based on a predetermined dispersion value;
    an optical loss/dispersion controller for measuring the optical loss value and the wavelength dispersion value of each of the optical transmission lines and outputting the predetermined optical loss value and the predetermined dispersion value so that the optical loss values and the wavelength dispersion values are equal in all of the optical transmission lines, and for controlling the variable optical attenuators and the variable dispersion compensation modules based on the outputted values;
    a receive amplifier for receiving an optical signal whose light level is kept constant as a result of controlling the optical loss value of each of the optical transmission lines and for amplifying the optical signal; and
    a transmission line switch controller for monitoring an optical signal level of a working optical transmission line and, if the optical signal level is lower than a threshold value, switching from the working optical transmission line to a protection optical transmission line.

2. An optical receiver for receiving an optical signal, comprising:
    variable optical attenuators located respectively on a plurality of optical transmission lines configured redundantly and for controlling optical loss values for the optical transmission lines based on a predetermined optical loss value;
    a receive amplifier for receiving an optical signal whose light level is kept constant as a result of controlling the optical loss value of each of the optical transmission lines and for amplifying the optical signal;
    a variable dispersion compensation module connected with the receive amplifier through a dispersion compensation module located between the receive amplifier and the variable dispersion compensation module and for controlling a wavelength dispersion value of a working optical transmission line based on a predetermined dispersion value;
    an optical loss/dispersion controller for measuring the optical loss values and wavelength dispersion values of the optical transmission lines and outputting the predetermined optical loss value so that the optical loss values are equal in all of the optical transmission lines and outputting the predetermined dispersion value corresponding with the wavelength dispersion value of the working optical transmission line, for controlling the variable optical attenuators and the variable dispersion compensation module; and
    a transmission line switch controller for monitoring an optical signal level of the working optical transmission line and, if the optical signal level is lower than a threshold value, switching from the working optical transmission line to a protection optical transmission line.

3. An optical receiver for receiving an optical signal, comprising:
    a variable optical attenuator for controlling an optical loss value of a working optical transmission line based on a predetermined optical loss value;

a receive amplifier for receiving an optical signal whose light level is kept constant as a result of controlling the optical loss value of each of a plurality of optical transmission lines and for amplifying the optical signal;

a variable dispersion compensation module connected with the receive amplifier through a dispersion compensation module located between the receive amplifier and the variable dispersion compensation module and for controlling a wavelength dispersion value of the working optical transmission line based on a predetermined dispersion value;

an optical loss/dispersion controller for measuring the optical loss values and wavelength dispersion values of the optical transmission lines and outputting the predetermined optical loss value corresponding with the optical loss value of the working optical transmission line and outputting the predetermined dispersion value corresponding with the wavelength dispersion value of the working optical transmission line, for controlling the variable optical attenuator and the variable dispersion compensation module; and a transmission line switch controller for monitoring an optical signal level of the working optical transmission line and, if the optical signal level is lower than a threshold value, switching from the working optical transmission line into a protection optical transmission line.

4. An optical transmission system for transmitting an optical signal, comprising:

an optical transmitter associated with a plurality of optical transmission lines configured redundantly and for transmitting an optical signal; and an optical receiver including variable optical attenuators located respectively on the plurality of optical transmission lines configured redundantly and for controlling an optical loss value for each of the optical transmission lines based on a predetermined optical loss value; variable dispersion compensation modules located respectively on the plurality of optical transmission lines configured redundantly and for controlling a wavelength dispersion value for each of the optical transmission lines based on a predetermined dispersion value; an optical loss dispersion controller for measuring the optical loss values and the wavelength dispersion values of all of the optical transmission lines and outputting the predetermined optical loss value and the predetermined dispersion value so that the optical loss values and the wavelength dispersion values are equal in all of the optical transmission lines, and for controlling the variable optical attenuators and the variable dispersion compensation modules, a receive amplifier for receiving an optical signal whose light level is kept constant as a result of controlling the optical loss value of each of the optical transmission lines and for amplifying the optical signal; and a transmission line switch controller for monitoring an optical signal level of a working optical transmission line and, if the optical signal level is lower than a threshold value switching from the working optical transmission line to a protection optical transmission line.

5. The optical transmission system according to claim 4, wherein the optical receiver includes an OSC (Optical Supervisory Channel) signal notice module for notifying the optical transmitter of the selected optical transmission line through an OSC signal, and wherein the optical transmitter includes a transmitting side switch module for recognizing the optical transmission line selected by the opposite side through the OSC signal and switching the optical transmission line.

6. An optical transmission system for transmitting an optical signal, comprising:

an optical transmitter associated with a plurality of optical transmission lines configured redundantly and for transmitting the optical signal; and an optical receiver including variable optical attenuators located respectively on a plurality of optical transmission lines configured redundantly and for controlling an optical loss value for each of the optical transmission lines based on a predetermined optical loss value; a receive amplifier for receiving an optical signal whose light level is kept constant as a result of controlling the optical loss value of each of the optical transmission lines and for amplifying the optical signal; a variable dispersion compensation module connected with the receive amplifier through a dispersion compensation module located between the receive amplifier and the variable dispersion compensation module and for controlling a wavelength dispersion value of a working optical transmission line based on a predetermined dispersion value; an optical loss dispersion controller for measuring the optical loss values and wavelength dispersion values of the optical transmission lines and outputting the predetermined optical loss value so that the optical loss values are equal in all of the optical transmission lines and outputting the predetermined dispersion value corresponding with the wavelength dispersion value of the working optical transmission line, and for controlling the variable optical attenuators and the variable dispersion compensation module; and a transmission line switch controller for monitoring an optical signal level of the working optical transmission line and, if the optical signal level is lower than a threshold value, switching from the working optical transmission line to a protection optical transmission line.

7. The optical transmission system according to claim 6, wherein the optical receiver includes an OSC (Optical Supervisory Channel) signal notice module for notifying the optical transmitter of the selected optical transmission line through an OSC signal, and, wherein the optical transmitter includes a transmitting side switch module for recognizing the optical transmission line selected by the opposite side through the OSC signal and switching the optical transmission line.

8. An optical transmission system for transmitting an optical signal, comprising:

an optical transmitter associated with a plurality of optical transmission lines configured redundantly; and an optical receiver including a variable optical attenuator for controlling an optical loss value of a working optical transmission line based on a predetermined optical loss value, a receive amplifier for receiving an optical signal whose light level is kept constant as a result of controlling the optical loss value of each of the optical transmission lines and for amplifying the optical signal; a variable dispersion compensation module connected with the receive amplifier through a dispersion compensation module located between the receive amplifier and the variable dispersion compensation module and for controlling a wavelength dispersion value of the working optical transmission line based on a predetermined dispersion value; an optical loss/dispersion controller for measuring the optical loss values and wavelength dispersion values of the optical transmission lines and outputting the predetermined optical loss value corresponding with the optical loss value of the working optical transmission line and outputting the predetermined dispersion value corresponding with the wavelength dispersion value of the working optical transmission line, and for controlling the variable optical attenuator and the variable dispersion compensation module, and a transmission line switch controller for monitoring an optical signal level of the working optical transmission line and, if the optical signal level is lower than a threshold value, switching from the working optical transmission line to a protection optical transmission line.

9. The optical transmission system according to claim 8, wherein the optical receiver includes an OSC (Optical Supervisory Channel) signal notice module for notifying the optical transmitter of the selected optical transmission line through an OSC signal, and wherein the optical transmitter includes a transmitting side switch module for recognizing the optical transmission line selected by the opposite side through the OSC signal and switching the optical transmission line.

* * * * *

UNITED STATES PATENT AND TRADEMARK OFFICE
CERTIFICATE OF CORRECTION

PATENT NO. : 7,113,709 B2
APPLICATION NO. : 11/024854
DATED : September 26, 2006
INVENTOR(S) : Tatsuya Kawasumi It is certified that error appears in the above-identified patent and that said Letters Patent is hereby corrected as shown below:

Column 11, line 26, change "into" to --to--;
              line 43, change "loss dispersion" to --loss/dispersion--;
              line 51, after "modules" insert --;--; and
              line 59, after "value" insert --,--.
Column 12, line 24, change "loss dispersion" to --loss/dispersion--.

Signed and Sealed this

Thirteenth Day of February, 2007

JON W. DUDAS
*Director of the United States Patent and Trademark Office*